United States Patent
Ballapuram et al.

(10) Patent No.: US 11,748,033 B2
(45) Date of Patent: Sep. 5, 2023

(54) TRANSACTION MANAGEMENT USING METADATA

(71) Applicant: Micron Technology, Inc., Boise, ID (US)

(72) Inventors: Chinnakrishnan Ballapuram, San Jose, CA (US); Kang-Yong Kim, Boise, ID (US); Saira Samar Malik, Lafayette, IN (US); Taeksang Song, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/390,093

(22) Filed: Jul. 30, 2021

(65) Prior Publication Data

US 2022/0035568 A1   Feb. 3, 2022

Related U.S. Application Data

(60) Provisional application No. 63/060,382, filed on Aug. 3, 2020.

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0679* (2013.01); *G06F 12/0238* (2013.01)

(58) Field of Classification Search
CPC .... G06F 3/0604; G06F 3/0611; G06F 3/0656; G06F 3/0659; G06F 3/0679; G06F 3/068; G06F 3/0685; G06F 12/0238; G06F 12/0868; G06F 12/0871; G06F 2212/1016; G06F 2212/214; G06F 2212/502; G06F 2212/7203; Y02D 10/00
See application file for complete search history.

(56) References Cited

U.S. PATENT DOCUMENTS

| | | | | |
|---|---|---|---|---|
| 5,815,675 | A * | 9/1998 | Steele | G06F 12/0835 |
| | | | | 711/146 |
| 8,301,832 | B1 * | 10/2012 | Moore | G06F 3/0688 |
| | | | | 711/103 |
| 8,499,102 | B2 * | 7/2013 | Beaman | G06F 12/0866 |
| | | | | 710/6 |
| 2016/0210159 | A1 * | 7/2016 | Wilson | G06F 9/44505 |
| 2018/0059987 | A1 * | 3/2018 | Nimmagadda | G06F 12/0866 |

* cited by examiner

*Primary Examiner* — Larry T Mackall
(74) *Attorney, Agent, or Firm* — Holland & Hart LLP

(57) ABSTRACT

Methods, systems, and devices for transaction management using metadata are described. In some examples, a memory device may include a volatile memory, and a non-volatile memory, which may have different access latencies. The memory device may receive from a host device a read command for data located at an address of the non-volatile memory. In response to the read command, the memory device and may determine whether the data is stored in the volatile memory. The memory device may then transmit, to the host device data and according to an expected latency, a set of data and an indication of whether the set of data was previously requested by the host device or unrequested by the host device. In some examples, the memory device may also transmit an identifier associated with the read command and a hash of the address.

22 Claims, 10 Drawing Sheets

TRANSACTION MANAGEMENT USING METADATA

CROSS REFERENCE

The present Application for Patent claims the benefit of U.S. Provisional Patent Application No. 63/060,382 by BALLAPURAM et al., entitled "TRANSACTION MANAGEMENT USING METADATA," filed Aug. 3, 2020, which is assigned to the assignee hereof, and which is expressly incorporated by reference in its entirety herein.

BACKGROUND

The following relates generally to one or more systems and more specifically to transaction management using metadata.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
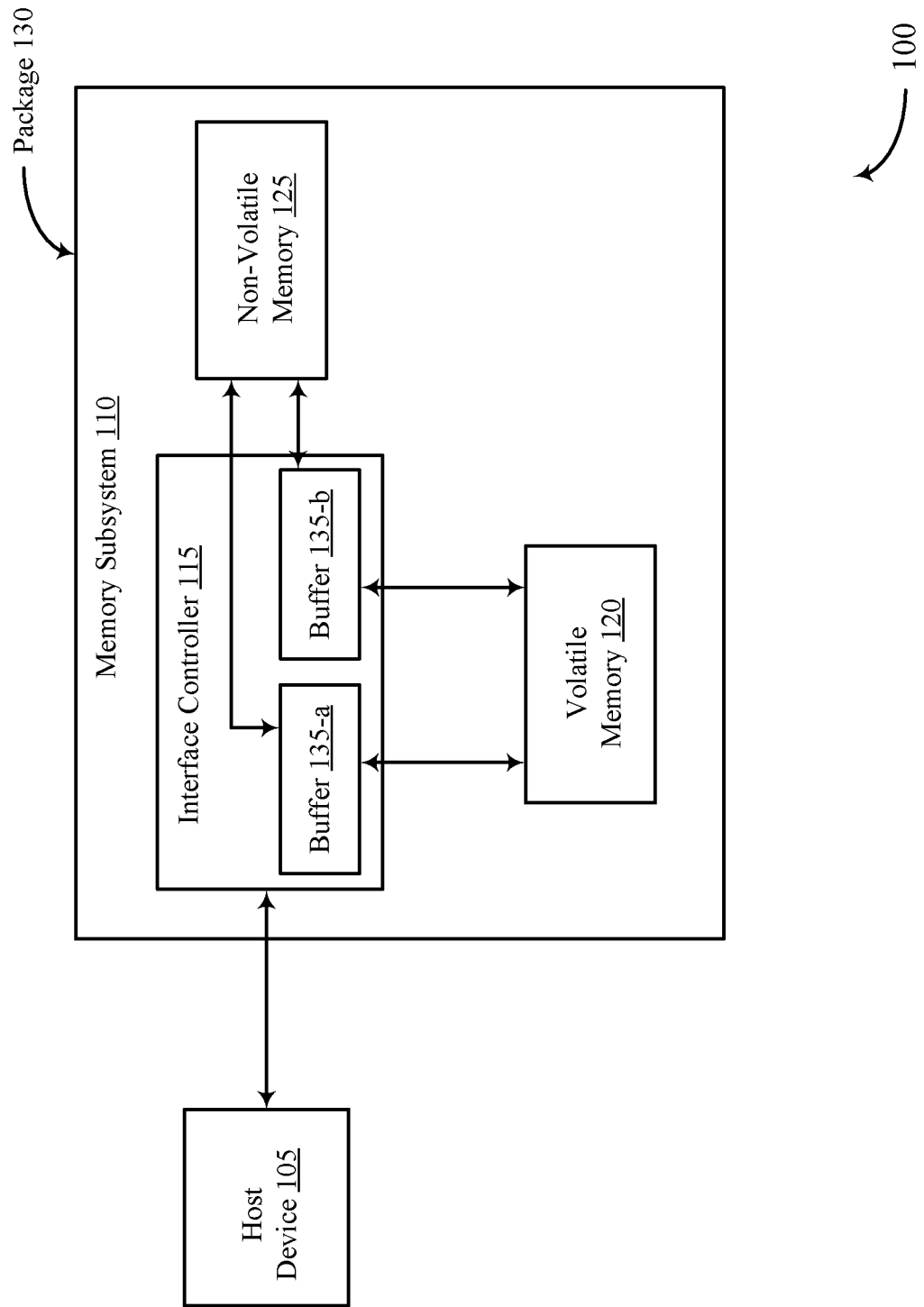
FIG. 1 shows an example of a system that supports transaction management using metadata in accordance with examples as disclosed herein.

A device, such as an electronic device, may include a non-volatile memory that serves as a main memory (e.g., a primary memory for storing information among other operations) and a volatile memory that serves as a cache. Such a configuration may allow the device to benefit from various advantages of non-volatile memory (e.g., non-volatility, high storage capacity, low power consumption) while maintaining compatibility with a host device. However, a device that uses both non-volatile memory and volatile memory may experience different latencies associated with accessing the different memories. For example, accessing the non-volatile memory may take longer than accessing the volatile memory. Thus, the latency of an access operation may be non-deterministic, which may negatively impact communications with a host device that may have set (e.g., uniform) timing constraints. For example, the host device may expect requested data to be returned according to a predetermined latency relative to requesting the data.

According to the techniques described herein, a device with non-deterministic access timing may satisfy the timing constraints of a host device by sending garbage data (e.g., unrequested data) or previously requested data to the host device in lieu of currently requested data that is unavailable for transmission. The device may send the garbage data or the previously requested data with a latency expected by the host device so that the timing constraints of the host device are met. To prevent confusion at the host device, the device may also transmit metadata that indicates whether the returned data is garbage data or previously requested data. In one example, the device may transmit metadata (e.g., a validity signal) that indicates that the returned data is garbage data that the host device can discard. In another example, the device may transmit metadata (a read command identifier and/or address hash) that indicates which previously requested data is being returned so that the host device can process the returned data appropriately and perform one or more operations based on the returned data. Thus, in some examples, a host device may determine how to process a returned set of data based on the metadata accompanying the set of data. As described herein, sending metadata along with garbage data or previously requested data may be one aspect or characteristic of a transactional channel protocol implemented by the device.

Features of the disclosure are initially described in the context of a system and memory subsystem as described with reference to FIGS. 1 and 2. Features of the disclosure are described in the context of timing diagrams as described with reference to FIGS. 3 and 4, and process flows as described with reference to FIGS. 5 and 6. These and other features of the disclosure are further illustrated by and described with reference to an apparatus diagram and flowcharts that relate to using metadata to manage transactions as described with reference to FIGS. 7-10.

FIG. 1 illustrates an example of a system 100 that supports transactional channel protocol in accordance with examples as disclosed herein. The system 100 may be included in an electronic device such a computer or phone. The system 100 may include a host device 105 and a memory subsystem 110. The host device 105 may be a processor or system-on-a-chip (SoC) that interfaces with the interface controller 115 as well as other components of the electronic device that includes the system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the system 100 may be capable of machine-type communication (MTC), machine-to-machine (M2M) communication, or device-to-device (D2D) communication. In some examples, the device associated with the system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64 B) or 128 bytes (128 B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-*a*. After storing the data in the buffer 135-*a*, the interface controller 115 may transfer the data from the buffer 135-*a* to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120.

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of then sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-*a* (e.g., in response to determining that one of the n sets of volatile memory cells stores the requested data) so that it can be transmitted to the host device 105. The term "hit" may be used to refer to the scenario where the volatile memory 120 stores data requested by the host device 105. If then sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-*a* (e.g., in response to determining that the n sets of volatile memory cells do not store the requested data) so that it can be transmitted to the host device 105. The term "miss" may be used to refer to the scenario where the volatile memory 120 does not store data requested by the host device 105.

In a miss scenario, after transferring the requested data to the buffer 135-*a*, the interface controller 115 may transfer the requested data from the buffer 135-*a* to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-*b* so that it can be transferred to the non-volatile memory 125 for storage. Such a process may be referred to as "eviction" and the data transferred from the volatile memory 120 to the buffer 135-*b* may be referred to as "victim" data. In some cases, the interface controller 115 may transfer a subset of the victim data from the buffer 135-*b* to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., when interface controller operates in one mode such as a write-back mode), dirty data may be data that is present in the volatile memory 120 but not present in the non-volatile memory 125.

To support communications with the host device 105, the host device 105 and the memory subsystem 110 may support a transactional channel protocol as described herein. The transactional channel protocol may define how the memory subsystem 110 responds to access requests from the host device 105, how the host device 105 processes data from the memory subsystem 110, how data and metadata should be transmitted over various channels (e.g., communication paths involving data pins, data buses, data bus interfaces, etc.), and the meaning that should be attributed to various signals, among other characteristics. In some examples, the transactional channel protocol may have different modes that define different behavior, signaling, and communication parameters. For example, one mode ("Mode A") may define behavior, signaling, and communication parameters for the in-order servicing of access requests from the host device 105. Another mode ("Mode B") may define behavior, signaling, and communication parameters for out-of-order servicing of access requests from the host device 105.

As noted, the host device 105 may support a protocol that imposes various timing constraints for communicating with the host device 105. For example, the host device 105 may expect requests for data to be satisfied according to a predetermined latency. But the memory subsystem 110 may be unable to comply with the latency constraints of the host device 105 because the volatile memory 120 and the non-volatile memory 125 may be associated with different access times. For example, it may take the memory subsystem 110 longer to access the non-volatile memory 125 than the volatile memory 120. Access time may refer to the amount of time it takes the memory subsystem 110 to retrieve and prepare data for transmission in response to a request from the host device 105 and may be measured relative to receipt of the request. When access timing varies between memories the memory subsystem 110 may be unable to comply with timing constraints of the host device 105. For instance, if data requested by the host device 105 is stored in the non-volatile memory 125, the memory subsystem 110 may be unable to return the data according to the timing constraints of the host device 105 because it takes too long to retrieve the data from the non-volatile memory 125.

According to the techniques described herein, the memory subsystem 110 may satisfy the timing constraints for the host device 105, even when requested data is not ready for transmission, by returning other data according to a latency expected by host device 105. For example, when the memory subsystem 110 determines that a recent request for data cannot be timely serviced (e.g., because the requested data is in the non-volatile memory 125), the memory subsystem 110 may return either unrequested data or previously requested data according to the timing constraints of the host device 105. Because the host device 105 is expecting the data it recently requested, and not unrequested or previously requested data, the memory subsystem 110 may also send to the host device 105 metadata that provides information on the returned data.

For example, if the returned data is unrequested data, the memory subsystem 110 may send a validity flag that indicates the returned data was not requested by the host device 105, which may enable the host device 105 to discard the data. Alternatively, if the returned data is previously requested data, the memory subsystem 110 may send a command identifier (ID) that indicates the read command associated with the data and/or an address hash that indicates the memory address associated with the data. By referencing the command ID and/or address hash, the host device 105 may match the returned data to the appropriate read command and process the returned data accordingly. If the returned data is garbage data or previously requested data (e.g., data requested based on a previous read command), the host device 105 may also re-transmit the read command for the requested data.

Figure 2:
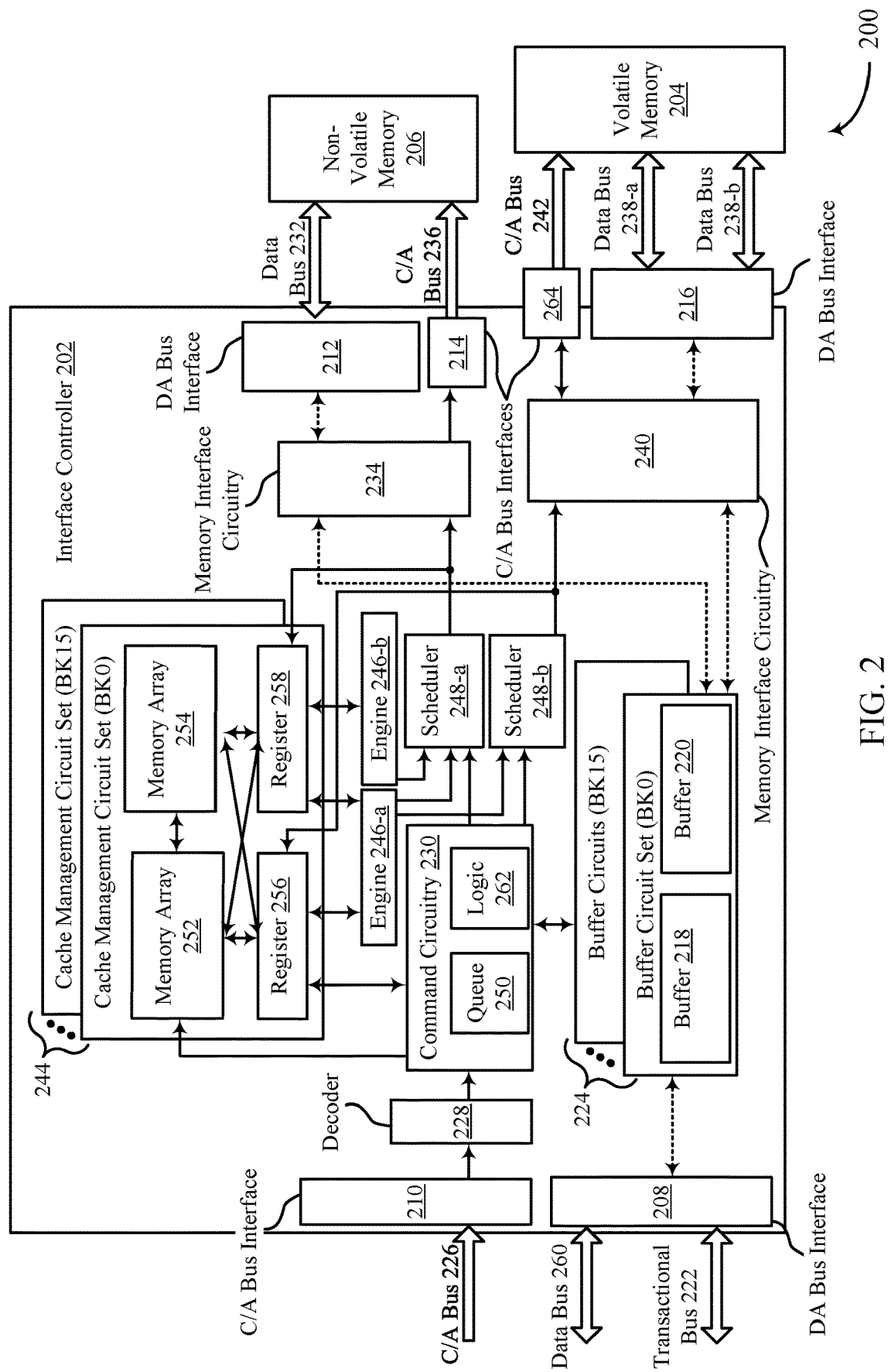
FIG. 2 illustrates an example of a memory subsystem that supports transaction management using metadata in accordance with examples of the present disclosure.

FIG. 2 illustrates an example of memory subsystem 200 that supports transactional channel protocol in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor, and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the quantity of memory cells or column addresses in a row, or the quantity of column addresses accessed during an access operation. Alternatively, a page size may refer to a size of data handled by various interfaces. In some cases, different memory device types may have different page sizes. For example, a DRAM page size (e.g., 2 kB) may be a superset of a non-volatile memory (e.g., FeRAM) page size (e.g., 64 B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller quantity of FeRAM cells may be activated when an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide efficiency benefits relative to volatile memory cells (e.g., DRAM cells in the volatile memory 204), as it may reduce or eliminate constraints to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the quantity of columns or memory cells in a row. As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any quantity of data buses 260 and any quantity of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a storage command or retrieval command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a CDRAM Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as SRAM cells.

Storage information may include content information, validity information, or dirty information (or any combination thereof) associated with the volatile memory 204. Content information (which may also be referred to as tag information or address information) may indicate which data is stored in a set of volatile memory cells. For example, the content information (e.g., a tag address) for a set of one or more volatile memory cells may indicate which set of one or more non-volatile memory cells currently has data stored in the set of one or more volatile memory cells. Validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., content and validity information) for an associated bank (e.g., BK0) of the volatile memory 204. The storage information may be stored on a per-page basis (e.g., there may be respective storage information for each page of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set of volatile memory cells when actual data is stored in that set of volatile memory cells. This bit may be referred to as a validity bit or a validity flag. As with the content information, the validity information stored in the memory array 252 may be stored on a per-page basis. Thus, each validity bit may indicate the validity of data stored in an associated page in some examples.

The memory array 254 may be similar to the memory array 252 and may also include memory cells that store validity information for a bank (e.g., BK0) of the volatile memory 204 that is associated with the memory array 252. However, the validity information stored in the memory array 254 may be stored on a sub-block basis as opposed to a per-page basis for the memory array 252. For example, the validity information stored in the memory cells of the memory array 254 may indicate the validity of data for subsets of volatile memory cells in a set (e.g., page) of volatile memory cells. As an example, the validity information in the memory array 254 may indicate the validity of each subset (e.g., 64 B) of data in a page of data stored in BK0 of the volatile memory 204. Storing content information and validity information on a per-page basis in the memory array 252 may allow the interface controller 202 to quickly and efficiently determine whether there is a hit or miss for data in the volatile memory 204. Storing validity information on a sub-block basis may allow the interface controller 202 to determine which subsets of data to preserve in the non-volatile memory 206 during an eviction process.

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information) from the memory array 252 or the scheduler 248-*b* or both. The cache management circuitry set may also include a second register (e.g., a register 258 which may be a victim page tag (VPT) register) configured to receive storage information from the memory array 254 and the scheduler 248-*a* or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on content information from the register 256.

The engine 246-*a* may be coupled with the register 256, the register 258, and the schedulers 248. The engine 246-*a* may be configured to receive storage information from various components and issue commands to the schedulers 248 based on the storage information. For example, when the interface controller 202 is in a first mode such as a write-through mode, the engine 246-*a* may issue commands to the scheduler 248-*b* and in response the scheduler 248-*b* to initiate or facilitate the transfer of data from the buffer 218 to both the volatile memory 204 and the non-volatile memory 206. Alternatively, when the interface controller 202 is in a second mode such as a write-back mode, the engine 246-*a* may issue commands to the scheduler 248-*b* and in response the scheduler 248-*b* may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-*b* may be coupled with the register 258 and the scheduler 248-*a*. The engine 246-*b* may be configured to receive storage information from the register 258 and issue commands to the scheduler 248-*a* based on the storage information. For instance, the engine 246-*b* may issue commands to the scheduler 248-*a* to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-*b* may indicate which one or more subsets (e.g., which 64 B) of the set of data in the buffer 220 should be transferred to the non-volatile memory 206.

The scheduler 248-*a* may be coupled with various components of the interface controller 202 and may facilitate accessing the non-volatile memory 206 by issuing commands to the memory interface circuitry 234. The commands issued by the scheduler 248-*a* may be based on commands from the command circuitry 230, the engine 246-*a*, the engine 246-*b*, or a combination of these components. Similarly, the scheduler 248-*b* may be coupled with various components of the interface controller 202 and may facilitate accessing the volatile memory 204 by issuing commands to the memory interface circuitry 240. The commands issued by the scheduler 248-*b* may be based on commands from the command circuitry 230 or the engine 246-*a*, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204. In either mode, the interface controller 202 may first check to see if the volatile memory 204 has memory cells available to store the data. To do so, the command circuitry 230 may reference the memory array 252 (e.g., using a set of the memory address bits) to determine whether one or more of the n sets (e.g., pages) of volatile memory cells associated with the memory address are empty (e.g., store random or invalid data). In some cases, a set of volatile memory cells in the volatile memory 204 may be referred to as a line or cache line.

If one of then associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the old data (e.g., existing data) in one of the n associated sets of volatile memory cells to the buffer 220. The dirty information for the old data may also be transferred to the memory array 254 or register 258 for identification of dirty subsets of the old data. After the old data is stored in the buffer 220, the new data can be transferred from the buffer 218 to the volatile memory 204 and the old data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-b based on dirty information transferred (e.g., from the volatile memory 204) to the memory array 254 or register 258 during the eviction process.

In another example, the interface controller 202 may receive a retrieval command from the host device. The retrieval command may be received over the C/A bus 225 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets of volatile memory cells associated with the memory address stores the requested data. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells are available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

As noted, the latency associated with accessing the non-volatile memory 206 may be different than the latency associated with accessing the volatile memory 204. For example, retrieving data from the non-volatile memory 206 may take longer than retrieving data from the volatile memory 204. This means that when there is a cache miss, the memory subsystem 200 may still be in the process of retrieving the data at the time the host device expects the requested data to be returned. Thus, the memory subsystem 200 may fail to comply with timing constraints of the host device, which may impair system performance.

According to the techniques described herein, the memory subsystem 200 may respond to a cache miss for requested data by transmitting unrequested data or previously requested data to the host device when the host device expects the requested data, thereby satisfying the timing constraints of the host device. The memory subsystem 200 may concurrently transmit metadata with the unrequested or previously requested data to that the host device knows how to process the returned data.

As an example, the memory subsystem 200 may be operating in Mode A, which may define the procedures for returning data in the same order that the requests are received. To illustrate Mode A, consider a scenario in which the memory subsystem 200 receives a retrieval request (e.g., a read command) for data stored at a non-volatile memory address. The retrieval request may be received via C/A bus 226 and C/A bus interface 210. In response to the retrieval request the memory subsystem 200 may reference the tag information for volatile memory rows associated with the non-volatile memory address to determine that the requested data is not in the volatile memory 204 (e.g., the memory subsystem 200 may determine a cache miss). Accordingly, the memory subsystem 200 may retrieve the requested data from the non-volatile memory 206. For example the memory subsystem 200 may read the requested data from the non-volatile memory and transfer the requested data to the buffer 218. While the requested data is being retrieved the memory subsystem 200 may, in accordance with aspects of Mode A, transmit garbage data (e.g., unrequested data, random data) to the host device during a period of time that the host device expects the requested data. Thus, the timing constraints of the host device may be met. To avoid confusion at the host device, the memory subsystem 200 may also transmit metadata (e.g., validity signal) that indicates the returned data was not requested by the host device and thus can be discarded. Thus, the host device may discard the returned garbage data and retransmit the read command for the requested data.

As another example, the memory subsystem 200 may be operating in Mode B, which may define the procedure for returning data in a different order than requested. Mode B may be similar to Mode A in certain aspects. However, instead of returning garbage data in while the requested data is being retrieved from the non-volatile memory 206, the memory subsystem 200 may return data that was previously requested by the host device. Thus, the memory subsystem 200 may return data out of order with respect to reception of the data requests. To avoid confusion at the host device, the memory subsystem 200 may also transmit metadata (e.g., a read command ID, an address hash) that indicates which previously requested data is being returned. Based on the read command ID and/or address hash, the host device may match the returned data with its appropriate read command and process the returned data accordingly. In some examples, the host device may also retransmit the read command for the requested data that was not returned.

Figure 3:
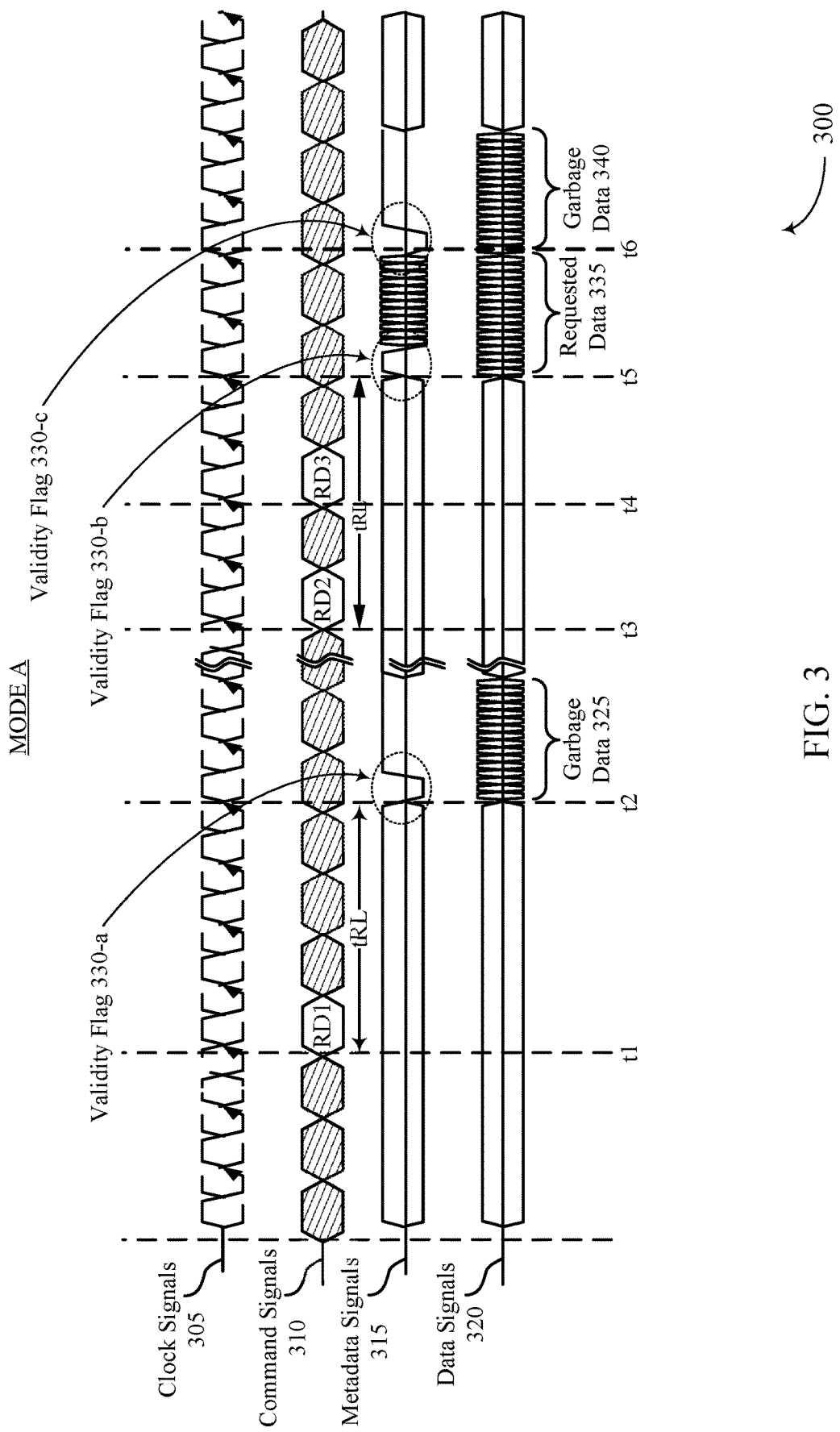
FIGS. 3 and 4 illustrate examples of timing diagrams that support transaction management using metadata in accordance with examples of the present disclosure.

FIG. 3 illustrates an example of a timing diagram 300 that supports transaction management using metadata in accordance with examples as disclosed herein. The timing diagram 300 may illustrate the operations of an apparatus operating in Mode A of a transactional channel protocol. Thus, the timing diagram 300 may illustrate communications between a host device and a memory device (e.g., a memory subsystem, an interface controller) each operating in Mode A as described herein. Mode A may also be referred to as a first mode. In Mode A, the memory device may satisfy timing constraints of the host device by satisfying read requests in order of receipt and returning garbage data to the host device along with a validity indicator when requested data cannot be timely retrieved. Satisfying a read command may refer to returning data requested by the read command, whereas satisfying the timing constraints of a read command may refer to returning data according to a latency associated with the read command.

The memory device may include a volatile memory and a non-volatile memory, which may be associated with different access latencies. Additionally, the memory device may be coupled with a host device that has various timing constraints, including a timing constraint for returning requested data. According to the techniques described herein, the memory device may perform the operations of timing diagram 300 to satisfy the timing constraints of the host device.

The memory device may be coupled with the host device via multiple transmission lines, which may be part of data buses, C/A buses, and/or transactional buses that are configured to convey information (e.g., data, commands, addresses, metadata) between the memory device and the host device. For example, the memory device may be coupled with hose device via one or more transmission lines dedicated to clock signals ("clock transmission line"), one or more transmission lines dedicated to commands ("command transmission line one or more transmission lines dedicated to metadata ("metadata transmission line"), one or more transmission lines dedicated to data ("data transmission line"). In some examples, the one or more command transmission lines are included in the C/A bus 226, the one or more metadata transmission lines are included in the transactional bus 222, and the one or more data transmission lines are included in the data bus 260 as described with reference to FIG. 2. A transmission line as described herein may be part of channel or communication path between two device (e.g., the memory device and the host device).

Each transmission line may be coupled with a respective pin or conductive pad of the memory device at one end and a respective pin or conductive pad at the host device at the other end. For example, the clock transmission line may terminate at clock pin, the command transmission line may terminate a command pin, the metadata transmission line may terminate at a metadata pin (e.g., a DMI pin) and the data transmission line may terminate a data pin (e.g., a DQ pin).

The memory device may transmit or receive clock signals 305 over the clock transmission line. The clock signal 305 may be used to ensure synchronicity between the memory device and the host device. The host device may transmit, and the memory device may receive, command signals 310 over the command transmission line. For example, although read commands are shown, the memory device may receive activate commands, read commands, write commands, and precharge commands, among others, over the command transmission line. A command include an opcode and a memory address. The memory device may transmit metadata signals 315 over the metadata transmission line and data signals 320 over the data transmission line. The metadata signals 315 may indicate information about the data signals 320 transmitted over the data transmission line, among other types of information. For example, the metadata signals 315 may indicate whether data signals 320 represent valid data, garbage data (e.g., invalid data, unrequested data, random data), or previously requested data.

Although described with reference to a single metadata transmission line, the metadata signals 315 may be transmitted over multiple (e.g., two) metadata transmission lines, each of which may terminate at a respective metadata pin (e.g., DMI pin 0 and DMI pin 1).

Timing diagram 300 may illustrate signaling exchanged over the transmission lines when the host device requests data from the memory device. For example, at time t1 the host device may transmit a first read command (denoted RD1) to the memory device. The first read command may indicate that the memory device is to return data located at a first memory address in the non-volatile memory. The host device may expect the memory device to return the requested data according to a first latency relative to transmission (or receipt) of the first read command. For example, the host device may expect the memory device to return the requested data at time t2 according to a first latency (e.g., a read latency denoted tRL). Prior to the read command the host may transmit an activate command that indicates the memory device is to activate the row of non-volatile memory associated with the memory address. The host device may also transmit (e.g., immediately preceding the read command) a column access strobe (CAS) command, which may indicate one or more columns of the volatile memory. According to supported timing constraints, after transmitting an activate command the host device may wait a duration of time (e.g., a read command latency, denoted tRCD) before sending the first read command.

In response to the first read command (RD1), the memory device may determine whether the requested data is stored in the volatile memory of the memory device (e.g., the memory device may determine whether there is a cache hit or miss). If the requested data is stored in the volatile memory, the memory device may return the requested data to the host device according to the read latency (e.g., tRL) expected by the host device. The memory device may be able to return the requested data according to the expected read latency because the volatile memory has an access speed that is shorter than the expected read latency. Thus, the memory device may service the first read command by returning the requested data at time t2, and in doing so satisfy the timing constraints of the host device. The memory device may also transmit a validity flag that indicates the returned data is the data requested by the host device.

However, in some cases the requested data may not be stored at the volatile memory. In such instances, the memory device may retrieve the requested data from the non-volatile memory, a process which may take longer than read latency tRL. To satisfy the read latency expected by the host device, the memory device may transmit garbage data 325 over the data transmission line at time t2. Garbage data may refer to any data not requested by the host device in the last n read commands or the last x ms, or data that does not have an associated read command pending (e.g., queued) at the memory device. In addition to the garbage data, the memory device may transmit on the metadata transmission line(s) a validity flag 330-a that indicates that the data returned at time t2 is garbage data. As described herein and with reference to FIG. 2, after retrieving the requested data from the non-volatile memory the memory device may store the requested data in a buffer (e.g., the buffer 218) or the volatile memory (e.g., the volatile memory 204) so that a subsequent request for the data can be satisfied according to the timing constraints of the host device. For example, the memory device may read the data located at the address of the non-volatile memory associated with the read command and write the data to the volatile memory.

As shown in the timing diagram 300, the validity flag 330-a may be represented by a pair of bits transmitted during the first two unit intervals (UIs) of the data transmission that includes garbage data 325. A unit interval may represent a clock cycle or the duration of time used to represent a bit. Thus, the validity flag 330-a may be transmitted in parallel (e.g., concurrently) with the first two bits of the garbage data 325. Transmitting the validity flag 330-a at the beginning of the corresponding data transmission (e.g., during the leading two bits of the garbage data 325) may allow the host device to conserve power or processing resources by ignoring or discarding the garbage data that follows the first two bits of the garbage data. A validity flag may refer to any signal that indicates the request-status of data (e.g., a signal that indicates whether data is garbage data). A validity flag may also be referred to herein as a validity signal, validity indicator, validity bit, or other suitable terminology.

Different values of the validity flag 330-a may represent different statuses of the data returned at t2. For example, when the memory device returns garbage data, as is the case in timing diagram 300, the validity flag 330-a be the bit value '00' (shown as a low signal for two consecutive UIs). When the memory device returns requested data, the validity flag 330-a may be the bit value '11' (shown as a high signal for two consecutive UIs). Thus, the host device may reference the validity flag 330-a to determine whether data received from the memory device is garbage data or actual data (e.g., data requested by read command RD1). Although described with reference to two bits transmitted on two metadata transmission lines (four bits collectively), the techniques described herein can be implemented using any quantity of bits on any quantity of metadata transmission lines.

At time t3, the host device may transmit another read command for the same data requested by first read command RD1. For example, the host device may transmit to the memory device a second read command (denoted RD2) that indicates the memory device is to return data located at the first memory address in the non-volatile memory. The second read command R2D for the same data may be transmitted in response to the host device determining that it received garbage data at time t2 (e.g., based on the validity flag 330-a).

The host device may expect the memory device to return the data requested by the second read command RD2 according to the first latency. For example, the host device may expect the memory device to return the requested data at time t5 in accordance with the read latency tRL. Because the memory device previously moved the requested data to the volatile memory (or buffer) in response to the first command RD1, the requested data may be available in the volatile memory (or buffer). Accordingly, the memory device may satisfy the second read command by reading the requested data from the volatile memory (or buffer) and transmitting the requested data 335 to the host device at time t5. Additionally, the memory device may transmit the validity flag 330-b (e.g., '11') over the metadata transmission line to indicate that the returned data was the data requested by the second read command RD2.

In some examples, the memory device may transmit additional metadata over the metadata transmission line(s). For example, after transmitting the validity flag at time t5, the memory device may transmit metadata that indicates a status of the volatile memory, cyclic redundancy check (CRC) bits, internal operations (IoPs), read credits, and/or write credits, among other information. The host device may know which pulses represent which metadata based on the UI in which a pulse is transmitted. For example, the host device may know that the signal on the metadata transmission line during the first two UIs represents the validity flag. The association between UI position and metadata type may be defined by the transactional channel protocol as described herein.

At time t4, the host device may transmit a third read command (denoted RD3) to the memory device. The third read command may indicate that the memory device is to return data located at a second memory address in the non-volatile memory. The host device may expect the memory device to return the requested data according to the first latency. For example, the host device may expect the memory device to return the requested data at time t6 in accordance with the read latency tRL. However, the data requested by the third read command RD3 may not be stored in any of the volatile memory rows associated with the second memory address. Nevertheless, the memory device may satisfy the timing constraints of the host device by transmitting garbage data 340 to the host device at t6. Additionally, the memory device may transmit the validity flag 330-c (e.g., '00') over the metadata transmission line to indicate that the returned data is not the data requested by the third read command RD3. As described herein and with reference to FIG. 2, after retrieving the requested data from the non-volatile memory the memory device may store the requested data in a buffer (e.g., the buffer 218) or the volatile memory (e.g., the volatile memory 204) so that a subsequent request for the data can be satisfied according to the timing constraints of the host device.

Thus, a memory device may satisfy the timing constraints of a host device by transmitting garbage data in response to a read command for data that cannot be retrieved in time to satisfy the read latency of the host device.

In some examples, the memory device may transmit, in addition to the validity flag 330-c, other metadata over the metadata transmission line(s). The metadata may include a timing indication that indicates a delay or a duration of time. The timing indication may be used by the host device to determine, for example, when to retransmit the third read command RD3. The timing indication may be represented by one or more metadata bits communicated over the metadata transmission line(s). For example, the timing indication may be represented by several bits (e.g., three bits), with different values of the bits indicating different durations of time. For instance, '000' may indicate no delay, '001' may indicate a 10 ns delay, '010' may represent a 25 ns delay, and so on and so forth. The duration of time indicated by the memory device may be based on a latency associated with retrieving (e.g., from the non-volatile memory) the data requested by the third read command RD3. Thus, the duration of time may be based on the business (e.g., activity level) of the memory device, which may be a function of the amount of pending commands in a transaction queue for the non-volatile memory. By waiting to retransmit the third read command RD3 until the memory device is ready to communicate the requested data, the host device may avoid receiving another round of garbage data.

Figure 4:
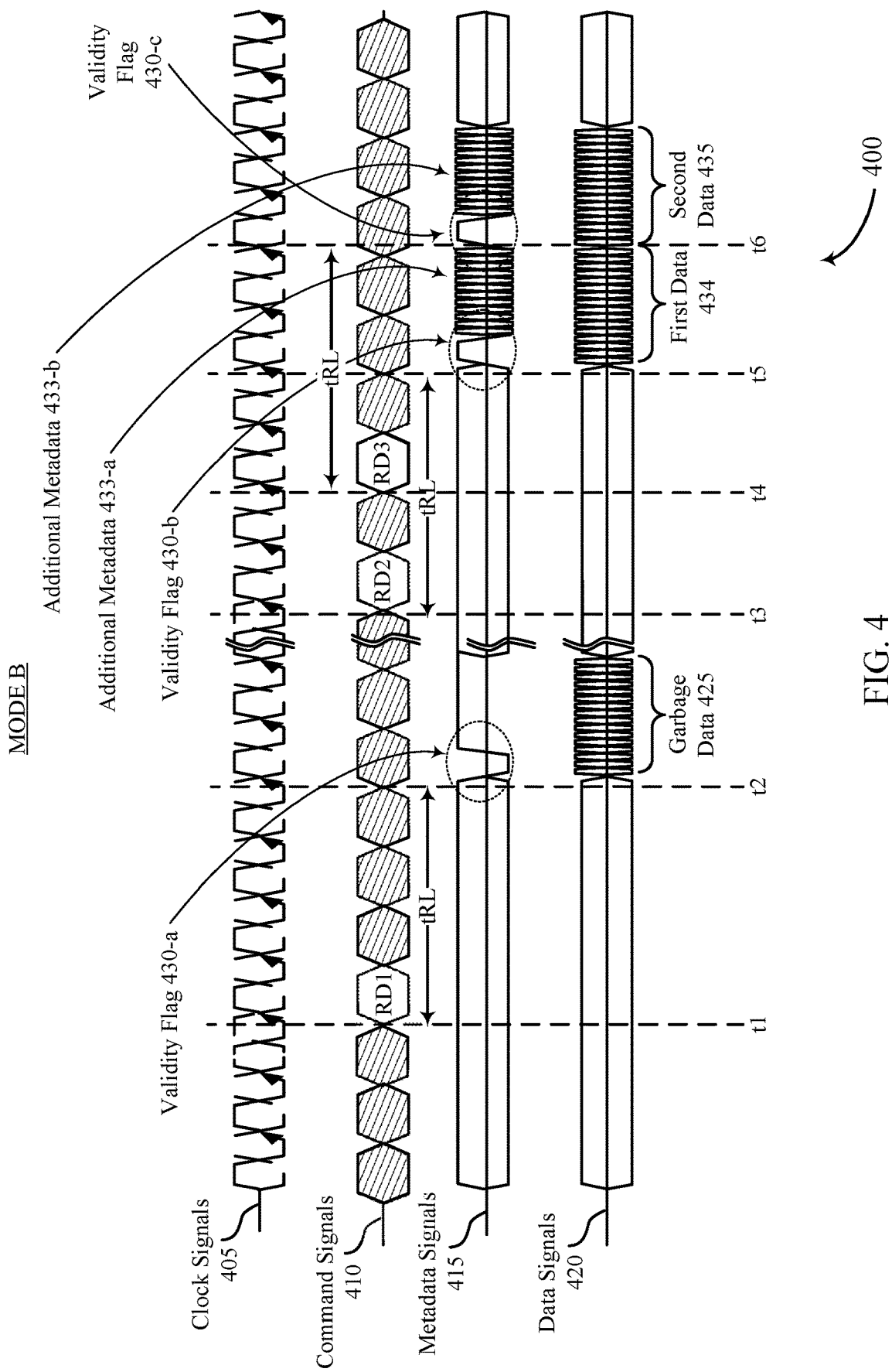

FIG. 4 illustrates an example of a timing diagram 400 that supports transaction management using metadata in accordance with examples as disclosed herein. The timing diagram 400 may illustrate the operations of an apparatus operating in Mode B of a transactional channel protocol. Thus, the timing diagram 400 may illustrate communications between a host device and a memory device (e.g., a memory subsystem, an interface controller) each operating in Mode B as described herein. Mode B may also be referred to as a second mode. In Mode B, the memory device may satisfy timing constraints of the host device by satisfying read requests out of order (e.g., by returning previously requested data to the host device along with a validity indicator when later requested data cannot be timely retrieved).

The memory device may include a volatile memory and a non-volatile memory, which may be associated with different access latencies. Additionally, the memory device may be coupled with a host device that has various timing constraints, including a timing constraint for returning requested data. According to the techniques described herein, the memory device may perform the operations of timing diagram 400 to satisfy the timing constraints of the host device.

The memory device may be coupled with the host device via one or more transmission lines as described with reference to FIG. 3. For example, the memory device may include a clock transmission line that is dedicated to clock signals 405, a command transmission line that is dedicated to command signals 410, a metadata transmission line that is dedicated to metadata signals 415, and a data transmission line that is dedicated to data signals 420. For brevity, additional description of these transmission lines is omitted here but can be found with reference to FIG. 3.

At time t1, at time t1 the memory device may receive a first read command (denoted RD1) from the host device. The first read command may indicate that the memory device is to return first data located at a first memory address in the non-volatile memory. The host device may expect the memory device to return the first data according the read latency tRL. Prior to the read command the host may transmit an activate command that indicates the memory device is to activate the row of non-volatile memory associated with the memory address. The host device may also transmit (e.g., immediately preceding the read command) a CAS command, which may indicate one or more columns of the volatile memory. According to supported timing constraints, after transmitting an activate command the host device may wait a duration of time before sending the first read command.

In response to the first read command RD1, the memory device may determine whether the first data is stored in the volatile memory of the memory device (e.g., the memory device may determine whether there is a cache hit or miss). If the first data is stored in the volatile memory, the memory device may return the first data to the host device according to the read latency (e.g., tRL) expected by the host device. The memory device may be able to return the first data according to the expected read latency because the volatile memory has an access speed that is shorter than the expected read latency. Thus, the memory device may service the first read command by returning the first data at time t2, and in doing so satisfy the timing constraints of the host device. The memory device may also transmit a validity flag that indicates the returned data is the first data requested by the host device.

However, in some cases the first data may not be stored at the volatile memory. In such instances, the memory device may retrieve the first data from the non-volatile memory, a process which may take longer than read latency tRL. To satisfy the read latency expected by the host device, the memory device may transmit garbage data 425 over the data transmission line at time t2. Additionally, the memory device may transmit on the metadata transmission line(s) a validity flag 430-a (e.g., '00') that indicates that the data returned at time t2 is garbage data. As described herein and with reference to FIG. 2, after retrieving the first data from the non-volatile memory the memory device may store the first data in a buffer (e.g., the buffer 218) or the volatile memory (e.g., the volatile memory 204) so that a subsequent request for the first data can be satisfied according to the timing constraints of the host device. For example, the memory device may read the first data located at the first address of the non-volatile memory associated with the read command and write the first data to the volatile memory.

At time t3, the memory device may receive a second read command (denoted RD2) for second data. The second read command RD2 may indicate that the memory device is to return the second data, which is located at a second memory address in the non-volatile memory. The host device may expect the memory device to return the second data at time t5 in accordance with the read latency tRL. In response to the second read command RD2, the memory device may determine whether the second data is stored in the volatile memory of the memory device (e.g., the memory device may determine whether there is a cache hit or miss). If the second data is stored in the volatile memory, the memory device may return the second data to the host device at time t5 along with a validity flag '11'. However, in some examples the second data is not stored in the volatile memory. In such examples, the memory device may return at time t5 the first data 434 requested by the first read command RD1 (even though the host device expects the second data requested by the second read command RD2).

The first data 434 may be available for transfer because it was previously stored in the volatile memory in response to the first read command RD1.

Because the host device expects the second data at time t5, rather than the first data 434, the memory device may transmit additional metadata 433-*a* that provides information about the returned data. For example, the memory device may transmit a validity flag 430-*b* (e.g., '11') that indicates the second data was requested by the host device. However, because the second data is being returned out-of-order, the memory device may also transmit a read command ID that is associated with the second read command RD2. This way, the host device may determine which read command is satisfied by the returned data (e.g., the host device may determine that the data returned at time t5 is the first data 434 and not the expected second data).

A read command ID may be a quantity of bits included in (or accompanying) a read command that identify the read command so that the read command can be distinguished from other read commands. Thus, the first read command RD1 may be associated with a respective read command ID and the second read command RD2 may be associated with a respective read command ID. To indicate the read command ID to the host device, the memory device may transmit multiple bits (e.g., pulses) over the metadata transmission line in a particular set of UIs. For example, if the read command ID is five bits, the read command ID may be indicated by signaling in UIs 12 through 17. The read command ID may be transmitted on one of the metadata transmission lines (e.g., the metadata transmission line that terminates at DMI pin 1) used to convey the validify flag. The metadata transmission line and UIs associated with read command ID signaling may be defined by the transactional channel protocol as described herein.

Thus, a read command ID may allow a host device to accurately identify returned data. But in some examples, channel conditions (e.g., interference, noise) may alter the read command ID during propagation over the metadata transmission line, which may result in the host device may mis-identifying the returned data. To ensure accurate identification of returned data, the memory device may also transmit an address hash to the host device. The address hash may indicate the non-volatile memory address associated with a read command. By comparing the address hash with the read command ID, the host device may accurately and reliably identify the returned data. For example, if the address hash matches the memory address associated with the read command ID, the host device may identify the returned data as the data requested by the read command. If the address hash does not match the memory address associated with the read command ID, the host device may determine that it cannot accurately identify the data (because either the read command ID or the address hash, or both, were altered during propagation). Accordingly, the host device may perform one or more remedial operations (e.g., discard the returned data, request for re-transmission of the read command ID and/or hash address).

An address hash may be a quantity of bits (e.g., three bits) that represent or identify a memory address, which may be represented by a larger quantity of bits (e.g., twenty bits). For example, an address hash may be quantity of bits that represent the memory address associated with a read command. A memory device may transmit an address hash to the host device—rather than the associated memory address—to save space on the metadata transmission line, as well as conserve power and processing resources, among other advantages. To indicate the address hash to the host device, the memory device may transmit multiple bits (e.g., pulses) over the metadata transmission line in a particular set of UIs. For example, if the address hash is three bits, the address hash may be indicated by signaling in UIs 13 through 15. The address hash may be transmitted on one of the metadata transmission lines (e.g., the metadata transmission line that terminates at DMI pin 0) used to convey the validify flag. The metadata transmission line and UIs associated with address hash signaling may be defined by the transactional channel protocol as described herein.

In some examples, the additional metadata 433-*a* may include a timing indication that indicates an amount of time that the host device should wait before, for example, retransmitting a read command for the second data. By complying with the timing indication, the host device may avoid prematurely sending another read command for the second data (e.g., the host device may avoid sending another read command for the second data before the memory device is ready to transmit the second data).

At time t4, the host device may transmit, and the memory device may receive, a third read command (denoted RD3) for third data. The third read command RD3 may indicate that the memory device is to return the third data, which is located at a third memory address in the non-volatile memory. The host device may expect the memory device to return the third data at time t6 in accordance with the read latency tRL. In response to the third read command RD3, the memory device may determine whether the third data is stored in the volatile memory of the memory device (e.g., the memory device may determine whether there is a cache hit or miss). If the third data is stored in the volatile memory, the memory device may return the third data to the host device at time t6 along with a validity flag '11'.

However, in some examples the third data is not stored in the volatile memory. In such examples, the memory device may return at time t6 the second data 435 requested by the second read command RD2 (even though the host device expects the third data requested by the third read command RD3). The second data 435 may be available for transfer because it was previously stored in the volatile memory in response to the second read command RD2. Additionally, the memory device may transmit the validity flag 330-*c* (e.g., '11') over the metadata transmission line to indicate that the returned data was the data requested by the host device. The memory device may also transmit (e.g., as part of the additional metadata 433-*b*) the read command ID for the second read command RD2 and the address hash for the memory address indicated by the second read command RD2 so that the data returned at time t6 can be identified by the host device.

Thus, a memory device may satisfy the timing constraints of a host device by transmitting previously requested data in response to a read command for data that cannot be retrieved in time to satisfy the read latency of the host device.

Figure 5:
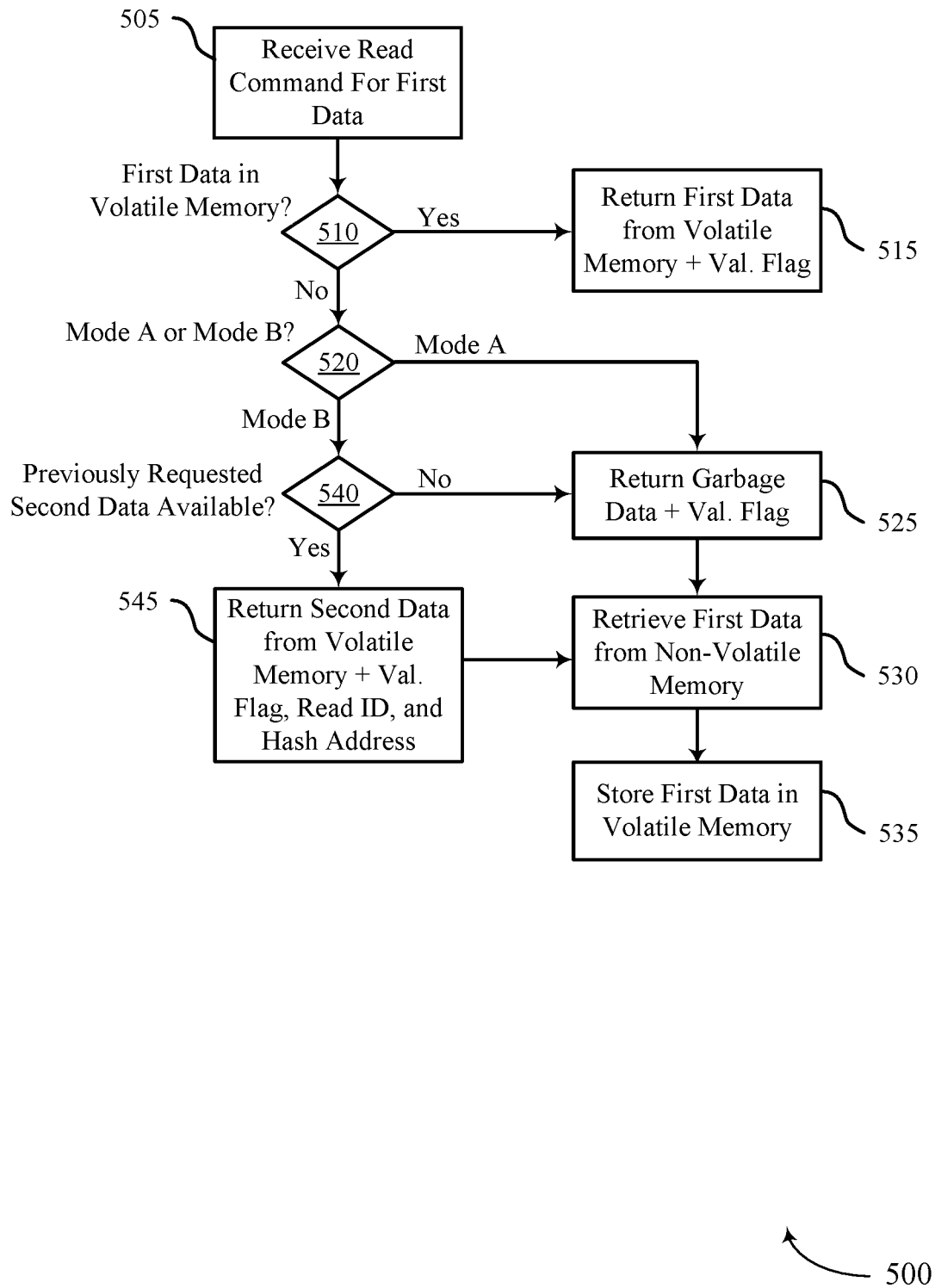
FIGS. 5 and 6 illustrate examples of process flows that support transaction management using metadata in accordance with examples of the present disclosure.

FIG. 5 illustrates an example of a process flow 500 that supports transaction management using metadata in accordance with examples as disclosed herein. The process flow 500 may illustrate operations of a memory device (e.g., a memory subsystem) that is coupled with a host device. The memory device may include a controller (e.g., the interface controller 202 as described with reference to FIG. 2), a volatile memory (e.g., the volatile memory 204 as described with reference to FIG. 2) and a non-volatile memory (e.g., the non-volatile memory 206 as described with reference to FIG. 2). The volatile memory and the non-volatile memory may be associated with different access latencies. The process flow 500 may illustrate operations performed by the memory device to satisfy a read latency constraint of the host device regardless of which memory (volatile or non-volatile) stores requested data.

In some examples, aspects of the process flow 500 may be implemented by an interface controller, among other components. Additionally or alternatively, aspects of the process flow 500 may be implemented as instructions stored in memory (e.g., firmware stored in the volatile memory 120 and/or the non-volatile memory 125). For example, the instructions, when executed by a controller (e.g., the interface controller 115), may cause the controller to perform the operations of the process flow 500.

Alternative examples of the process flow 500 may be implemented in which some operations are performed in a different order than described or are not performed at all. In some examples, the process flow 500 may include operations not mentioned below (e.g., additional operations may be added). Additionally, some operations may be performed in parallel (e.g., concurrently, or during overlapping times).

At 505, the memory device may receive an access command, which may be a read command for first data. The read command may be associated with an address of the non-volatile memory. The read command may be received and processed by a controller, such as the interface controller 202 as described with reference to FIG. 2.

At 510, the memory device may determine whether the first data is stored in the volatile memory. In some examples, the memory controller may determine whether the first data is stored at the volatile memory based on the non-volatile memory address associated with the read command. For example, the memory device may reference tag information for volatile memory rows associated with the non-volatile memory address to determine whether there is a cache hit or miss. In other examples, the memory controller may include a mapping table or other logic to determine whether the first data is stored at the volatile memory.

If the first data is stored in the volatile memory, the memory device may, at 515 transmit the first data to the host device according to the read latency expected by the host device. For example, the memory device may read the first data from the volatile memory, transfer the data to a buffer (e.g., the buffer 218), and then transmit the data to the host device over one or more data transmission lines (e.g., one or more data transmission lines included in the data bus 260). The memory device may also transmit a validity flag that indicates the corresponding returned data (e.g., the first data) was requested by the host device. The validity flag may be represented by one or more bits transmitted over one or more transmission lines coupled with the memory device and the host device. The transmission lines may be coupled with pins (e.g., pins of the memory device) that are reserved for transmitting metadata between the memory device and the host device. Transmitting the first data to the host device may satisfy the first read command and the read latency constraint of the host device.

If, at 510, the memory device determines that the first data is not stored in the volatile memory, the memory device may, at 520, determine whether the memory device is operating in Mode A or Mode B of a transactional channel protocol supported by the memory device. Although shown at 520, the determination of mode may occur earlier in the process flow 500 or may be skipped altogether. However, the determination is shown at 520 to illustrate the different operations the memory device may perform in the two modes.

If the memory device is operating in Mode A, the memory device may, at 525, transmit garbage data to the host device according to the read latency expected by the host device. The garbage data may be transmitted over a data transmission line as described with reference to FIG. 3. The memory device may also transmit a validity flag that indicates the corresponding returned data (e.g., the garbage data) was not requested by the host device. The validity flag may be transmitted concurrently (e.g., in parallel) with the garbage data, or at partially overlapping times. In some examples, the validity flag may be transmitted concurrent with the first leading bit(s) of the garbage data so that the host device can disregard the remaining bits of garbage data.

In some examples, the memory device may also transmit an indication of an amount of time the host device should wait before retransmitting the read command for the first data. By transmitting the timing indication, the memory device may ensure that the memory device will be ready to return the first data when the retransmitted read command is received from the host device. Thus, the memory device may avoid another round of returning garbage data, which may conserve resources of the memory device and the host device, among other elements in the system.

At 530, the memory device may retrieve the first data from the non-volatile memory so that it can be stored in the volatile memory. For example, the memory device may read the first data from the non-volatile memory and transfer the first data to a buffer (e.g., the buffer 218). Aspects of the operations at 525 and 530 may overlap in time (e.g., be performed wholly or partially in parallel). At 535, the memory device may store the first data in the volatile memory after transferring it to the volatile memory from the buffer. Storing the first data in the volatile memory may enable the memory device to satisfy a subsequent read command for the first data by sending the first data to the host device according to the expected read latency. In some examples, aspects of the operations at 535 and 525 may overlap in time (e.g., be performed wholly or partially in parallel).

If the memory device is operating in Mode B, the memory device may, at 540, determine whether second data previously requested by (but not yet returned to) the host device is available for transmission (e.g., stored in the buffer 218 or the volatile memory 204). For example, the memory device may determine whether a previous read request for the second data remains pending because garbage data was returned instead. If no previously requested data is available, the memory device may proceed to 525 and return garbage data and a corresponding validity flag (e.g., '00') to the host device according to the expected read latency. The memory device may also perform the operations at 530 and 535 to prepare the first data for future read commands.

If, at 540, the memory device determines that previously requested second data is available for transmission (e.g., stored in the buffer 218 or the volatile memory 204), the memory device may transmit the second data to the host device according to the expected read latency. For example, the memory device may return the second data to the host device during a period of time the host device expects to receive the first data. Previously requested data may refer to data requested by prior read command (relative to the most recent read command) that is queued or otherwise pending at the memory device. In some examples, previously requested data may refer to data that was requested by a pending read command that was received within a threshold quantity of read commands before the most recent read. For example, the second data may be previously requested data if the second read command was one of the last x read commands received by the memory device. Alternatively, previously requested data may refer to data that was requested within a threshold amount of time before the most recent read command. For example, the second data may be previously requested data if the second read command was received in the x ms window preceding the most recent read command. The memory controller may include queues, counters, tables, or other logic to determine whether data is previously requested data.

Because the second data is returned in the place of the first data at 545, the memory device may also transmit metadata that allows the host device to identify the second data. For example, the memory device may transmit over one or more metadata transmission lines the validity flag, the read command ID for the second read command, and the address hash associated with the second data. In some examples, validity flag, the read command ID, and the address hash are transmitted concurrent with different subsets (e.g., different bits) of the second data. In some examples, the memory device may also transmit, for example over the one or more metadata transmission lines, a timing indication associated with the retrieval of the first data. As noted, the timing indication may indicate an amount of time the host device is to observe before retransmitting another read command for the first data.

Concurrent with 545 or at overlapping times, the memory device may also perform the operations at 530 and 535 to prepare the first data for future read commands. Thus, in Mode B the memory device may service two read commands out of order with respect to the receipt of the read commands.

Figure 6:
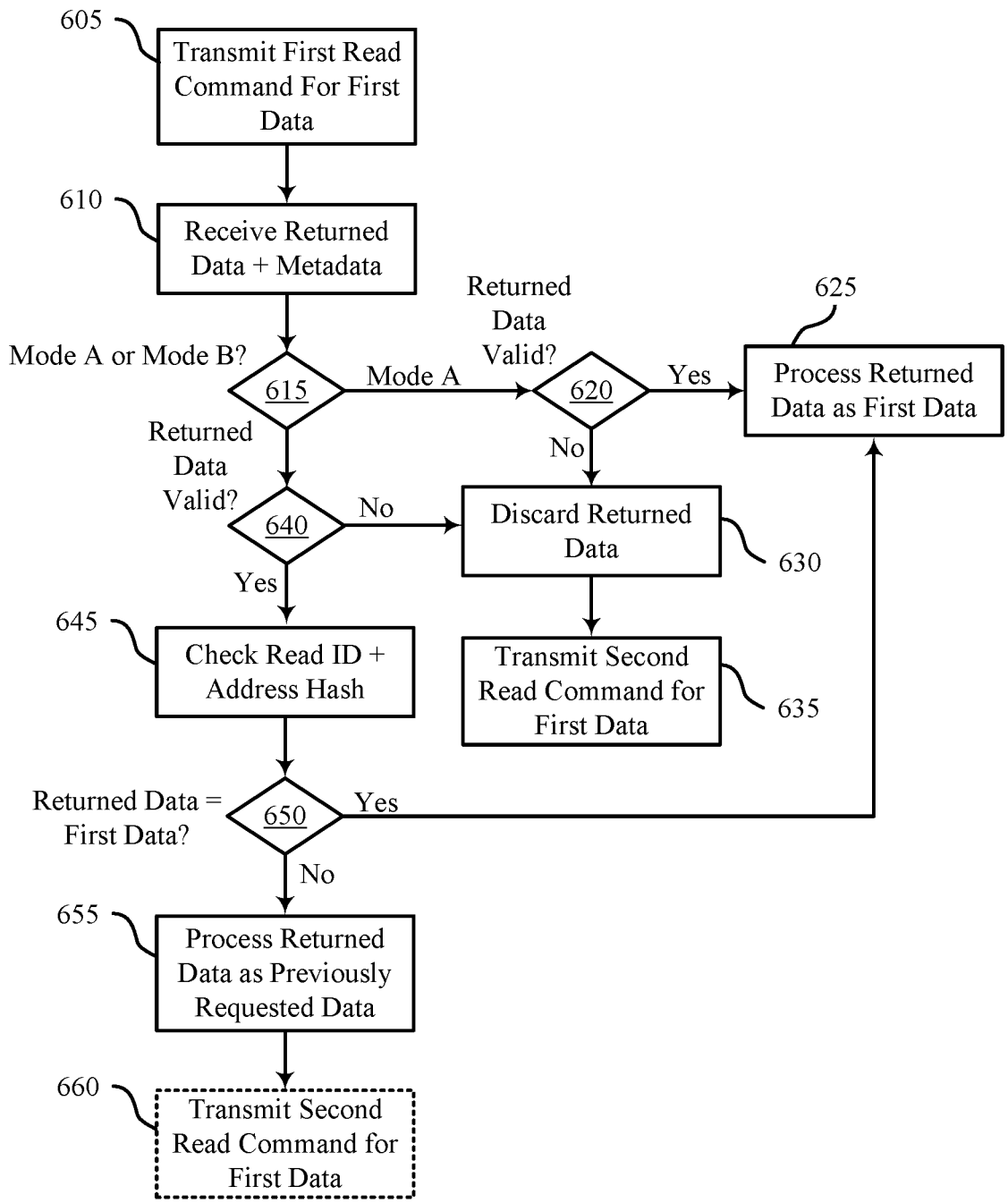

FIG. 6 illustrates an example of a process flow 600 that supports transaction management using metadata in accordance with examples as disclosed herein. The process flow 600 may illustrate operations of a host device (e.g., the host device 105) that is coupled with a memory device (e.g., a memory subsystem, an interface controller). The process flow 600 may illustrate operations performed by the memory host when a memory device is operating in Mode A or Mode B of the transactional channel protocol as described herein.

In some examples, aspects of the process flow 600 may be implemented by a host device or controller, among other components. Additionally or alternatively, aspects of the process flow 300 may be implemented as instructions stored in memory. For example, the instructions, when executed by a controller, may cause the controller to perform the operations of the process flow 600.

Alternative examples of the process flow 600 may be implemented in which some operations are performed in a different order than described or are not performed at all. In some examples, the process flow 600 may include operations not mentioned below (e.g., additional operations may be added). Additionally, some operations may be performed in parallel (e.g., concurrently, or during overlapping times).

At 605, the host device may transmit to the memory device a read command for first data. The read command may be associated with a memory address of the non-volatile memory where the first data is stored. The read command may be associated with a read command ID that identifies the read command and distinguishes the read command from other read commands. The host device may expect the memory device to return the first data during a period of time that is based on the read latency for the host device (e.g., tRL). At 610, the host device may receive data from the memory device during the period of time expected by the host device (e.g., the host device may receive data in accordance with the read latency tRL). The host device may also receive metadata associated with the data. For example, if the memory device is operating in Mode A, the metadata may include a validity flag, among other metadata. If the memory device is operating in Mode B, the metadata may include a validity flag, a read command ID, and an address hash, among other metadata. The metadata may be received over one or more metadata transmission lines during a period of time that the corresponding data is received over one or more data transmission lines.

At 615, the host device may determine whether the memory device is operating in Mode A or Mode B of the transactional channel protocol supported by the memory device. Although shown at 615, the determination of mode may occur earlier in the process flow 600 or may be skipped altogether. However, the determination is shown at 615 to illustrate the different operations the host device may perform when the memory device is in the two modes.

If the memory device is operating in Mode A, the host device may, at 620, determine whether the data returned at 610 is valid data or garbage data. The host device may determine whether the returned data is valid data or garbage data based on the accompanying validity flag. If the returned data is valid, the host device may, at 625, process the returned data the first data requested by the host device at 605. For example, the host device may transfer the first data to other components or devices for which the first data was intended. If the returned data is garbage data, the host device may discard the returned data at 630. The device may then transmit a second read command for the first data (because the request was not satisfied).

If the memory device is operating in Mode B, the host device may, at 640, determine whether the data returned at 610 is valid data or garbage data. The host device may determine whether the returned data is valid data or garbage data based on the accompanying validity flag. If, at 640, the returned data is determined to be garbage data, the host device may discard the data at 630 and transmit a second read command for the first data at 635. In some examples, the host device may determine a timing for sending the second read command based on a timing indication received from the memory device. The timing indication may indicate an amount of the time the host device is to wait before transmitting the second read command for the first data. So, in some examples, the host device may delay transmission of the second read command in accordance with the timing indication (e.g., the host device may wait until the indicated amount of time has expired before transmitting the second read command).

If, at 640, the returned data is determined to be valid data, the host device may, at 645, evaluate the read command ID and hash address corresponding to the returned data. For example, the host device may determine whether the memory address indicated by the hash address matches the memory address associated with the read command ID.

At 650, the host device may determine whether the returned data is the first data requested at 605 (e.g., the host device may verify whether the returned data is associated with the first read command). Put another way, the host device may determine whether the first data satisfies the first read command. The host device may determine that the returned data is the first data (i.e., satisfies the first read command) if the memory address indicated by the hash address matches the memory address associated with the read command ID for the first read command. The host device may determine that the returned data is previously requested data if the memory address indicated by the hash address matches the memory address associated with the read command ID for a read command that was transmitted before the first read command.

If the returned data is the first data (e.g., if the returned data satisfies the first read command), the host device may process the returned data as the first data at 625. If the returned data is previously requested data (e.g., if the returned data satisfies a previous read command), the host device may process the returned data as previously requested data at 655. The host device may also transmit a second read command for the first data at 660. In some examples, the host device may transmit the second read command based on a timing indication received from the memory device, as described herein. However, in some examples, the host device may not need to transmit a second read command for the first data (e.g., if the memory device returns the first data in response to a read command for different data, as described with reference to FIG. 4).

Figure 7:
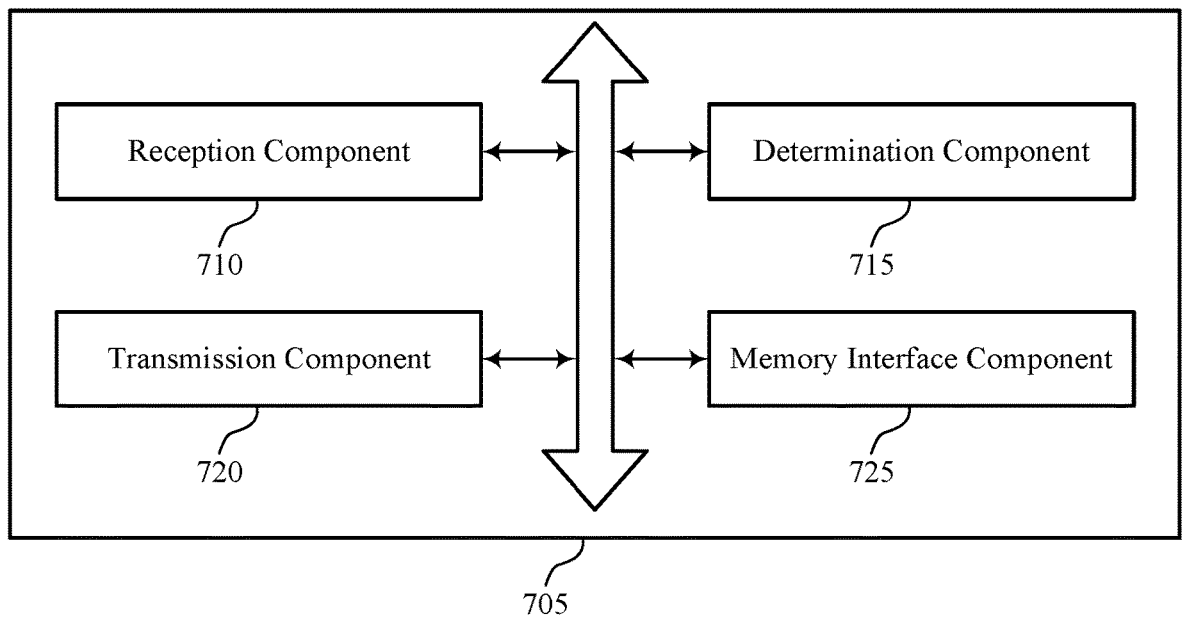
FIG. 7 shows a block diagram of a memory device that supports transaction management using metadata in accordance with examples of the present disclosure.

FIG. 7 shows a block diagram 700 of a memory device 705 that supports transaction management using metadata in accordance with examples as disclosed herein. The memory device 705 may be an example of aspects of a memory device or memory subsystem as described with reference to FIGS. 1 through 6. The memory device 705 may include a reception component 710, a determination component 715, a transmission component 720, and a memory interface component 725. Each of these modules may communicate, directly or indirectly, with one another (e.g., via one or more buses).

In a first example, the reception component 710 may receive, from a host device, a read command for a first set of data, the read command associated with a latency for returning the first set of data to the host device. The determination component 715 may determine, in response to receiving the read command, that the first set of data is stored in the non-volatile memory and not the volatile memory. The transmission component 720 may transmit, to the host device, a second set of data according to the latency for returning the first set of data and a signal (e.g., a validity flag) that indicates whether the second set of data was requested by the host device. In some examples, the transmission component 720 may transmit the signal concurrent with transmitting a first subset of the second set of data.

In some examples, the reception component 710 may receive, from the host device and after transmitting the second set of data, a second read command for the first set of data. In such examples, the transmission component 720 may transmit, to the host device and based at least in part on receiving the second read command, the first set of data and an indication (e.g., a validity flag) that the first set of data was requested by the host device.

In some examples, the memory interface component 725 may transfer the first set of data from the non-volatile memory to the volatile memory based at least in part on determining that the first set of data is stored in the non-volatile memory, where the first set of data is transmitted to the host device after the first set of data is transferred to the volatile memory.

In some examples, the reception component 710 may receive, from the host device, a second read command for the second set of data before receiving the read command for the first set of data, where the signal indicates that the second set of data was requested by the host device. In some examples, the transmission component 720 may transmit, concurrent with transmitting at least a subset of the second set of data, an indication of an identifier of the second read command (e.g., a read command ID). The transmission component 720 may also transmit, concurrent with transmitting at least a second subset of the second set of data, an indication of a hash associated with an address of the second set of data (e.g., an address hash).

In some examples, the transmission component 720 may transmit the signal as a first bit over a first transmission line and a second bit over a second transmission line, the first and second transmission lines coupled with the host device. In some examples, the first transmission line is coupled with DMI pin 0 and the second transmission line is coupled with DMI pin 1. In some examples, the transmission component 720 may transmit, over the first transmission line, a second signal that identifies a second read command for the second set of data; and transmit, over the second transmission line, a third signal that indicates an address associated with the second set of data. In some examples, the reception component 710 may receive, from the host device, a second read command for a third set of data after transmitting the second set of data. In such examples, the transmission component 720 may transmit, to the host device and based at least in part on receiving the second read command, the first set of data and a second signal (e.g., a validity flag) indicating that the first set of data was requested by the host device.

In a second example, the reception component 710 may receive a read command for a memory address of the non-volatile memory, the memory address indicating a set of non-volatile memory cells in the non-volatile memory. The determination component 715 may determine, based at least in part on the read command, whether first data stored in the set of non-volatile memory cells is also stored in a set of volatile memory cells in the volatile memory. The transmission component 720 may transmit, based at least in part on determining that the first data is not stored in the set of volatile memory cells, second data along with an indicator (e.g., a validity flag) that indicates whether the second data was requested. In some examples, the indicator is transmitted over a pin (e.g., DMI pin 0, DMI pin 1) reserved for metadata associated with operating the volatile memory as a cache. In some examples, the second data and the indicator are transmitted according to a predetermined latency (e.g., a read latency such as tRL).

In some examples, the determination component 715 may determine, based at least in part on receiving the read command, that the first data is not stored in the set of volatile memory cells, where the indicator indicates that the second data was not requested. In some examples, the memory interface component 725 may transfer, based at least in part on the determination, the first data from the set of non-volatile memory cells to the set of volatile memory cells.

In some examples, the reception component 710 may receive a second read command for the memory address after transferring the first data to the set of volatile memory cells. In some examples, the transmission component 720 may transmit the first data based at least in part on receiving the second read command for the memory address.

In some examples the reception component 710 may receive, before receiving the read command, a second read command for a second memory address associated with the second data, where the indicator indicates that the second data was requested. In some examples, the transmission component 720 may transmit a first plurality of bits that indicates an identifier associated with the read command (e.g., a read command ID); and transmit a second plurality of bits that indicates the second memory address (e.g., an address hash).

In some examples, the reception component 710 may receive, after receiving the read command, a second read command for a second memory address of the non-volatile memory. In some examples, the transmission component

720 may transmit, based at least in part on receiving the second read command, the first data along with a second indicator (e.g., a validity flag) that indicates the first data was requested. In some examples, a first latency between reception of the read command and transmission of the second data is equivalent to a second latency between reception of the second read command and transmission of the first data.

In a third example, the reception component 710 may receive a read command from a host device coupled with the interface controller. The transmission component 720 may transmit a set of data to the host device based at least in part on the read command, the set of data retrieved from the volatile memory or the non-volatile memory. And the transmission component 720 may transmit an indication of a request status for the set of data to the host device, the request status indicating whether the set of data was requested by the host device.

Figure 8:
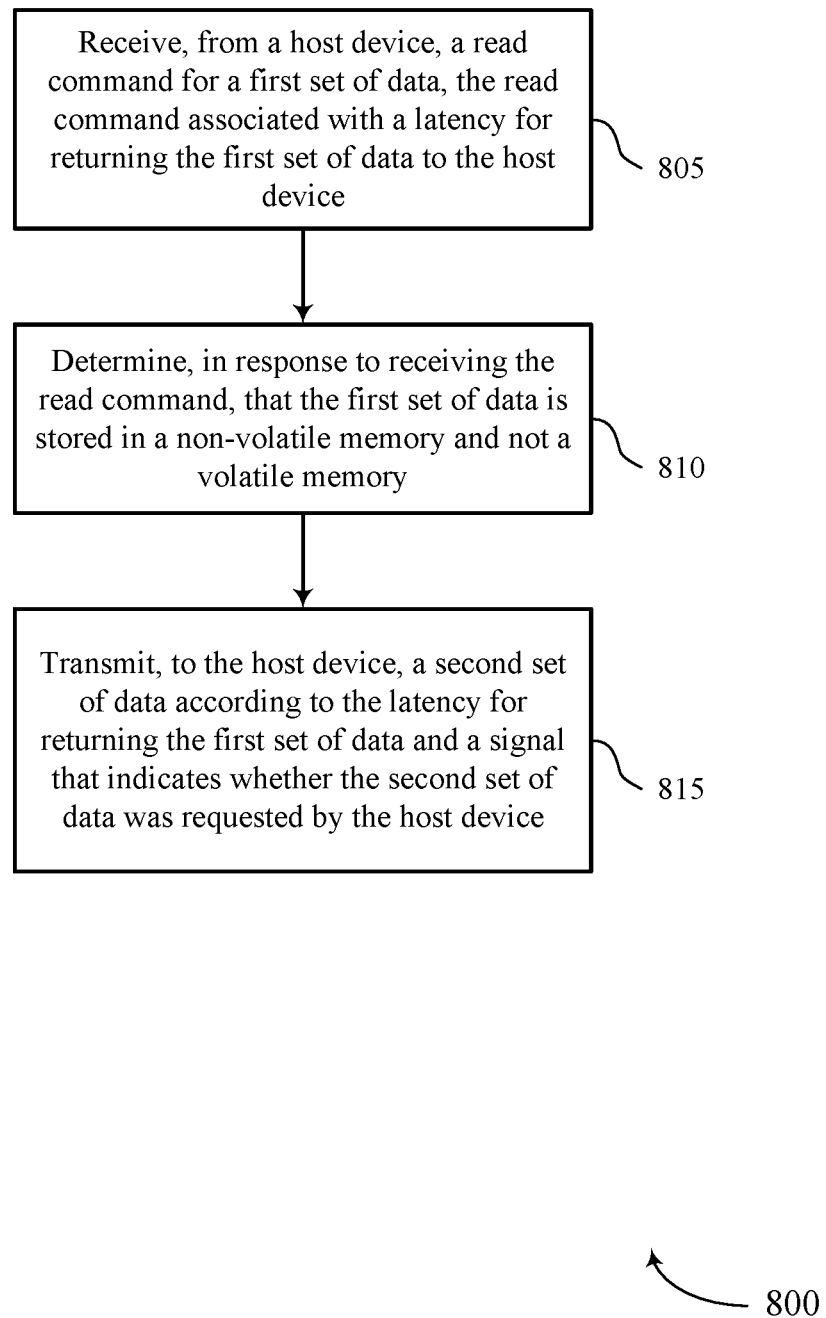
FIGS. 8 through 10 show flowcharts illustrating a method or methods that support transaction management using metadata in accordance with examples of the present disclosure.

FIG. 8 shows a flowchart illustrating a method or methods 800 that supports transaction management using metadata in accordance with aspects of the present disclosure. The operations of method 800 may be implemented by a memory device or its components as described herein. For example, the operations of method 800 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

In some examples, the memory device may include a volatile memory, a non-volatile memory, and an interface controller that is coupled with the volatile memory and the non-volatile memory. The interface controller may be operable to or configured to cause the memory device to perform the operations of method 900.

At 805, the memory device may receive, from a host device, a read command for a first set of data, the read command associated with a latency for returning the first set of data to the host device. The operations of 805 may be performed according to the methods described herein. In some examples, aspects of the operations of 805 may be performed by a reception component as described with reference to FIG. 7.

At 810, the memory device may determine, in response to receiving the read command, that the first set of data is stored in a non-volatile memory and not a volatile memory. The operations of 810 may be performed according to the methods described herein. In some examples, aspects of the operations of 810 may be performed by a determination component as described with reference to FIG. 7.

At 815, the memory device may transmit, to the host device, a second set of data according to the latency for returning the first set of data and a signal that indicates whether the second set of data was requested by the host device. The operations of 815 may be performed according to the methods described herein. In some examples, aspects of the operations of 815 may be performed by a transmission component as described with reference to FIG. 7.

In some examples, an apparatus as described herein may perform a method or methods, such as the method 800. The apparatus may include features, means, or instructions (e.g., a non-transitory computer-readable medium storing instructions executable by a processor) for receiving, from a host device, a read command for a first set of data, the read command associated with a latency for returning the first set of data to the host device, determining, in response to receiving the read command, that the first set of data is stored in a non-volatile memory and not a volatile memory, and transmitting, to the host device, a second set of data according to the latency for returning the first set of data and a signal that indicates whether the second set of data was requested by the host device.

Some examples of the method 800 and the apparatus described herein may further include operations, features, means, or instructions for receiving, from the host device and after transmitting the second set of data, a second read command for the first set of data, and transmitting, to the host device and based on receiving the second read command, the first set of data and an indication that the first set of data was requested by the host device.

Some examples of the method 800 and the apparatus described herein may further include operations, features, means, or instructions for transferring the first set of data from the non-volatile memory to the volatile memory based on determining that the first set of data may be stored in the non-volatile memory, where the first set of data may be transmitted to the host device after the first set of data may be transferred to the volatile memory.

Some examples of the method 800 and the apparatus described herein may further include operations, features, means, or instructions for receiving, from the host device, a second read command for the second set of data before receiving the read command for the first set of data, where the signal indicates that the second set of data was requested by the host device.

Some examples of the method 800 and the apparatus described herein may further include operations, features, means, or instructions for transmitting, concurrent with transmitting at least a subset of the second set of data, an indication of an identifier of the second read command, and transmitting, concurrent with transmitting at least a second subset of the second set of data, an indication of a hash associated with an address of the second set of data.

Some examples of the method 800 and the apparatus described herein may further include operations, features, means, or instructions for transmitting the signal concurrent with transmitting a first subset of the second set of data.

Some examples of the method 800 and the apparatus described herein may further include operations, features, means, or instructions for transmitting the signal as a first bit over a first transmission line and a second bit over a second transmission line, the first and second transmission lines coupled with the host device.

Some examples of the method 800 and the apparatus described herein may further include operations, features, means, or instructions for transmitting, over the first transmission line, a second signal that identifies a second read command for the second set of data, and transmitting, over the second transmission line, a third signal that indicates an address associated with the second set of data.

Some examples of the method 800 and the apparatus described herein may further include operations, features, means, or instructions for receiving, from the host device, a second read command for a third set of data after transmitting the second set of data, and transmitting, to the host device and based on receiving the second read command, the first set of data and a second signal indicating that the first set of data was requested by the host device.

Figure 9:
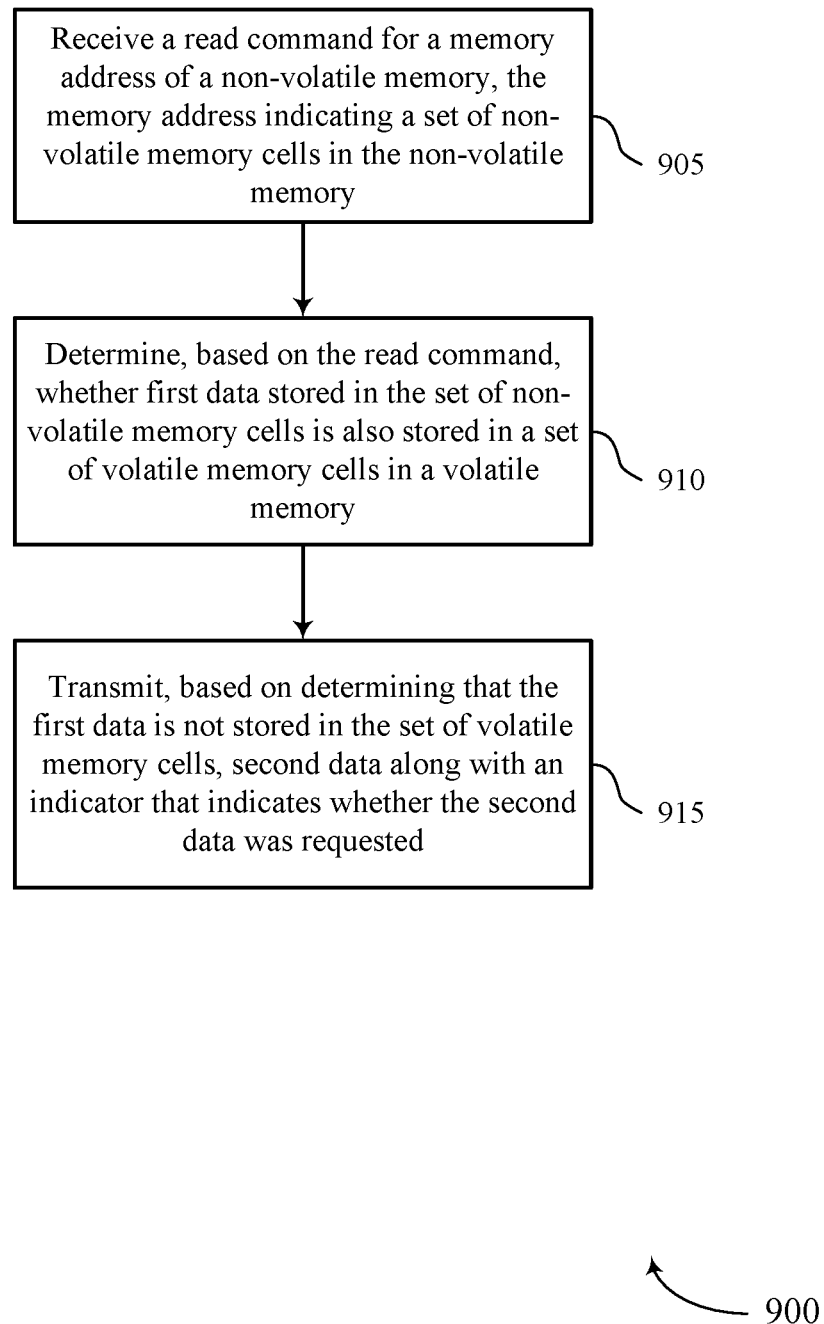

FIG. 9 shows a flowchart illustrating a method or methods 900 that supports transaction management using metadata in accordance with aspects of the present disclosure. The operations of method 900 may be implemented by a memory device or its components as described herein. For example, the operations of method 900 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

In some examples, the memory device may include an interface controller coupled with a volatile memory and a non-volatile memory. The interface controller may be operable to or configured to cause the memory device to perform the operations of method 900.

At 905, the memory device may receive a read command from a host device coupled with the interface controller. The operations of 905 may be performed according to the methods described herein. In some examples, aspects of the operations of 905 may be performed by a reception component as described with reference to FIG. 7.

At 910, the memory device may transmit a set of data to the host device based at least in part on the read command, the set of data retrieved from the volatile memory or the non-volatile memory. The operations of 910 may be performed according to the methods described herein. In some examples, aspects of the operations of 910 may be performed by a transmission component as described with reference to FIG. 7.

At 915, the memory device may transmit an indication of a request status for the set of data to the host device, the request status indicating whether the set of data was requested by the host device. The operations of 915 may be performed according to the methods described herein. In some examples, aspects of the operations of 915 may be performed by a transmission component as described with reference to FIG. 7.

In some examples, an apparatus as described herein may perform a method or methods, such as the method 900. The apparatus may include features, means, or instructions (e.g., a non-transitory computer-readable medium storing instructions executable by a processor) for receiving a read command for a memory address of a non-volatile memory, the memory address indicating a set of non-volatile memory cells in the non-volatile memory, determining, based on the read command, whether first data stored in the set of non-volatile memory cells is also stored in a set of volatile memory cells in a volatile memory, and transmitting, based on determining that the first data is not stored in the set of volatile memory cells, second data along with an indicator that indicates whether the second data was requested.

Some examples of the method 900 and the apparatus described herein may further include operations, features, means, or instructions for determining, based on receiving the read command, that the first data may be not stored in the set of volatile memory cells, where the indicator indicates that the second data was not requested, and transferring, based on the determination, the first data from the set of non-volatile memory cells to the set of volatile memory cells.

Some examples of the method 900 and the apparatus described herein may further include operations, features, means, or instructions for receiving a second read command for the memory address after transferring the first data to the set of volatile memory cells, and transmitting the first data based on receiving the second read command for the memory address.

Some examples of the method 900 and the apparatus described herein may further include operations, features, means, or instructions for receiving, before receiving the read command, a second read command for a second memory address associated with the second data, where the indicator indicates that the second data was requested.

Some examples of the method 900 and the apparatus described herein may further include operations, features, means, or instructions for transmitting a first set of bits that indicates an identifier associated with the read command, and transmitting a second set of bits that indicates the second memory address.

Some examples of the method 900 and the apparatus described herein may further include operations, features, means, or instructions for receiving, after receiving the read command, a second read command for a second memory address of the non-volatile memory, and transmitting, based on receiving the second read command, the first data along with a second indicator that indicates the first data was requested.

In some examples of the method 900 and the apparatus described herein, a first latency between reception of the read command and transmission of the second data may be equivalent to a second latency between reception of the second read command and transmission of the first data.

In some examples of the method 900 and the apparatus described herein, the indicator may be transmitted over a pin reserved for metadata associated with operating the volatile memory as a cache.

In some examples of the method 900 and the apparatus described herein, the second data and the indicator may be transmitted according to a predetermined latency.

Figure 10:
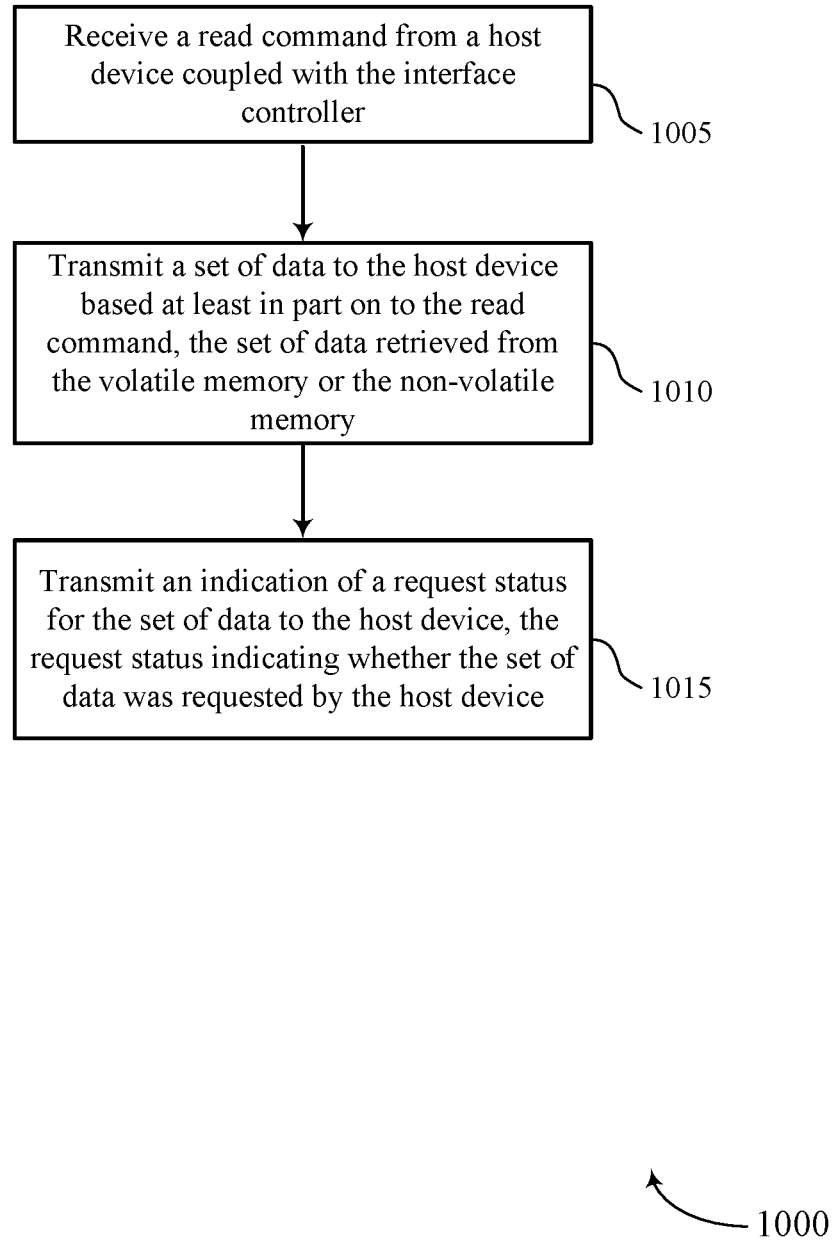

FIG. 10 shows a flowchart illustrating a method or methods 1000 that supports transaction management using metadata in accordance with aspects of the present disclosure. The operations of method 1000 may be implemented by a memory device or its components as described herein. For example, the operations of method 1000 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

In some examples, the memory device may include an interface controller coupled with a volatile memory and a non-volatile memory. The interface controller may be operable to or configured to cause the memory device to perform the operations of method 1000.

At 1005, the method may include receiving a read command from a host device coupled with the interface controller. The operations of 1005 may be performed according to the methods described herein. In some examples, aspects of the operations of 1005 may be performed by a reception component as described with reference to FIG. 7.

At 1010, the method may include transmit a set of data to the host device based at least in part on to the read command, the set of data retrieved from the volatile memory or the non-volatile memory. The operations of 1010 may be performed according to the methods described herein. In some examples, aspects of the operations of 1010 may be performed by a transmission component as described with reference to FIG. 7.

At 1015, the method may include transmitting an indication of a request status for the set of data to the host device, the request status indicating whether the set of data was requested by the host device. The operations of 1015 may be performed according to the methods described herein. In some examples, aspects of the operations of 1015 may be performed by a transmission component as described with reference to FIG. 7.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a volatile memory;
   a non-volatile memory; and
   an interface controller coupled with the volatile memory and the non-volatile memory, wherein the interface controller is operable to:
   receive, from a host device, a read command for a first set of data, the read command associated with a latency for returning the first set of data to the host device;
   determine, in response to receiving the read command, that the first set of data is stored in the non-volatile memory and not the volatile memory; and
   transmit concurrently, to the host device, a first subset of a second set of data according to the latency for returning the first set of data and a signal that indicates whether the second set of data was requested by the host device.

2. The apparatus of claim 1, wherein the interface controller is operable to:
   receive, from the host device and after transmitting the second set of data, a second read command for the first set of data; and
   transmit, to the host device and based at least in part on receiving the second read command, the first set of data and an indication that the first set of data was requested by the host device.

3. The apparatus of claim 2, wherein the interface controller is operable to:
   transfer the first set of data from the non-volatile memory to the volatile memory based at least in part on determining that the first set of data is stored in the non-volatile memory, wherein the first set of data is transmitted to the host device after the first set of data is transferred to the volatile memory.

4. The apparatus of claim 1, wherein the interface controller is operable to:
   receive, from the host device, a second read command for the second set of data before receiving the read command for the first set of data, wherein the signal indicates that the second set of data was requested by the host device.

5. The apparatus of claim 4, wherein the interface controller is operable to:
   transmit, concurrent with transmitting at least a subset of the second set of data, an indication of an identifier of the second read command; and
   transmit, concurrent with transmitting at least a second subset of the second set of data, an indication of a hash associated with an address of the second set of data.

6. The apparatus of claim 1, wherein the interface controller is operable to:
   receive, from the host device, a second read command for a third set of data after transmitting the second set of data; and transmit, to the host device and based at least in part on receiving the second read command, the first set of data and a second signal indicating that the first set of data was requested by the host device.

7. An apparatus, comprising:

a volatile memory;

a non-volatile memory; and an interface controller coupled with the volatile memory and the non-volatile memory, wherein the interface controller is operable to:

receive, from a host device, a read command for a first set of data, the read command associated with a latency for returning the first set of data to the host device;

determine, in response to receiving the read command, that the first set of data is stored in the non-volatile memory and not the volatile memory; and transmit, to the host device, a second set of data according to the latency for returning the first set of data and a signal that indicates whether the second set of data was requested by the host device, wherein the signal is transmitted as a first bit over a first transmission line and a second bit over a second transmission line, the first and second transmission lines coupled with the host device.

8. The apparatus of claim 7, wherein the interface controller is operable to:

transmit, over the first transmission line, a second signal that identifies a second read command for the second set of data; and transmit, over the second transmission line, a third signal that indicates an address associated with the second set of data.

9. An apparatus, comprising:

a volatile memory;

a non-volatile memory; and an interface controller coupled with the volatile memory and the non-volatile memory, wherein the interface controller is operable to:

receive a read command for a memory address of the non-volatile memory, the memory address indicating a set of non-volatile memory cells in the non-volatile memory;

determine, based at least in part on the read command, whether first data stored in the set of non-volatile memory cells is also stored in a set of volatile memory cells in the volatile memory; and transmit, based at least in part on determining that the first data is not stored in the set of volatile memory cells, second data along with an indicator that indicates whether the second data was requested, wherein the indicator is transmitted over a pin reserved for metadata associated with operating the volatile memory as a cache.

10. The apparatus of claim 9, wherein the interface controller is operable to:

determine, based at least in part on receiving the read command, that the first data is not stored in the set of volatile memory cells, wherein the indicator indicates that the second data was not requested; and transfer, based at least in part on determining that the first data is not stored in the set of volatile memory cells, the first data from the set of non-volatile memory cells to the set of volatile memory cells.

11. The apparatus of claim 10, wherein the interface controller is operable to:

receive a second read command for the memory address after transferring the first data to the set of volatile memory cells; and transmit the first data based at least in part on receiving the second read command for the memory address.

12. The apparatus of claim 9, wherein the interface controller is operable to:

receive, before receiving the read command, a second read command for a second memory address associated with the second data, wherein the indicator indicates that the second data was requested.

13. The apparatus of claim 12, wherein the interface controller is operable to:

transmit a first plurality of bits that indicates an identifier associated with the read command; and transmit a second plurality of bits that indicates the second memory address.

14. The apparatus of claim 9, wherein the interface controller is operable to:

receive, after receiving the read command, a second read command for a second memory address of the non-volatile memory; and transmit, based at least in part on receiving the second read command, the first data along with a second indicator that indicates the first data was requested.

15. The apparatus of claim 14, wherein a first latency between reception of the read command and transmission of the second data is equivalent to a second latency between reception of the second read command and transmission of the first data.

16. An apparatus, comprising:

a volatile memory;

a non-volatile memory; and an interface controller coupled with the volatile memory and the non-volatile memory, wherein the interface controller is operable to:

receive a read command for a memory address of the non-volatile memory, the memory address indicating a set of non-volatile memory cells in the non-volatile memory;

determine, based at least in part on the read command, whether first data stored in the set of non-volatile memory cells is also stored in a set of volatile memory cells in the volatile memory; and transmit concurrently, based at least in part on determining that the first data is not stored in the set of volatile memory cells, a first subset of second data along with an indicator that indicates whether the second data was requested, wherein the second data and the indicator are transmitted according to a predetermined latency.

17. A non-transitory computer-readable medium storing code comprising instructions, which when executed by a processor of an electronic device, cause the electronic device to:

receive, from a host device, a read command for a first set of data, the read command associated with a latency for returning the first set of data to the host device;

determine, in response to receiving the read command, that the first set of data is stored in a non-volatile memory and not a volatile memory; and transmit concurrently, to the host device, a first subset of a second set of data according to the latency for returning the first set of data and a signal that indicates whether the second set of data was requested by the host device.

18. The non-transitory computer-readable medium of claim 17, wherein the instructions, when executed by the processor of the electronic device, further cause the electronic device to:
receive, from the host device and after transmitting the second set of data, a second read command for the first set of data; and
transmit, to the host device and based at least in part on receiving the second read command, the first set of data and an indication that the first set of data was requested by the host device.

19. The non-transitory computer-readable medium of claim 18, wherein the instructions, when executed by the processor of the electronic device, further cause the electronic device to:
transfer the first set of data from the non-volatile memory to the volatile memory based at least in part on determining that the first set of data is stored in the non-volatile memory, wherein the first set of data is transmitted to the host device after the first set of data is transferred to the volatile memory.

20. The non-transitory computer-readable medium of claim 17, wherein the instructions, when executed by the processor of the electronic device, further cause the electronic device to:
receive, from the host device, a second read command for the second set of data before receiving the read command for the first set of data, wherein the signal indicates that the second set of data was requested by the host device.

21. The non-transitory computer-readable medium of claim 20, wherein the instructions, when executed by the processor of the electronic device, further cause the electronic device to:
transmit, concurrent with transmitting at least a subset of the second set of data, an indication of an identifier of the second read command; and
transmit, concurrent with transmitting at least a second subset of the second set of data, an indication of a hash associated with an address of the second set of data.

22. The non-transitory computer-readable medium of claim 17, wherein the instructions, when executed by the processor of the electronic device, further cause the electronic device to:
transmit the signal as a first bit over a first transmission line and a second bit over a second transmission line, the first and second transmission lines coupled with the host device.

* * * * *